United States Patent
Wang et al.

(10) Patent No.: US 10,670,770 B2
(45) Date of Patent: Jun. 2, 2020

(54) MULTI-STAGE LINEAR SOLUTION FOR IMPLICIT RESERVOIR SIMULATION

(71) Applicant: Landmark Graphics Corporation, Houston, TX (US)

(72) Inventors: Qinghua Wang, Katy, TX (US); Graham Christopher Fleming, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 289 days.

(21) Appl. No.: 14/427,115

(22) PCT Filed: Jun. 19, 2014

(86) PCT No.: PCT/US2014/043229
§ 371 (c)(1),
(2) Date: Mar. 10, 2015

(87) PCT Pub. No.: WO2015/195129
PCT Pub. Date: Dec. 23, 2015

(65) Prior Publication Data
US 2016/0259868 A1 Sep. 8, 2016

(51) Int. Cl.
*G01V 99/00* (2009.01)
*G01V 11/00* (2006.01)
(Continued)

(52) U.S. Cl.
CPC ............ *G01V 99/005* (2013.01); *E21B 43/00* (2013.01); *E21B 43/20* (2013.01); *G01V 11/00* (2013.01);
(Continued)

(58) Field of Classification Search
CPC ...... G06F 17/5009; G06F 17/12; G06F 17/16; G01V 99/005; G01V 11/00;
(Continued)

(56) References Cited

U.S. PATENT DOCUMENTS

2006/0265204 A1* 11/2006 Wallis ................. G06F 17/5018
703/10
2007/0255779 A1 11/2007 Watts, III
(Continued)

FOREIGN PATENT DOCUMENTS

WO WO-2013165363 A1 11/2013
WO WO-2015/195129 A1 12/2015

OTHER PUBLICATIONS

Leugering, Günter, et al., eds. Constrained optimization and optimal control for partial differential equations. vol. 160. Springer Science & Business Media. 2012. ISBN 978-3-0348-0132-4. pp. 154-159.*
(Continued)

*Primary Examiner* — Kamini S Shah
*Assistant Examiner* — John E Johansen
(74) *Attorney, Agent, or Firm* — Haynes and Boone, LLP (57) ABSTRACT

In some embodiments, a system, as well as a method and an article, may operate to generate a first matrix, based on equations that model a reservoir, that includes mass conservation and volume balance information for grid blocks in the reservoir; to generate a second matrix, based on the first matrix, that includes saturation information and pressure information of each grid block; to remove the saturation information from the second matrix to generate a third matrix that includes only pressure information; to solve the third matrix to generate a first pressure solution; to solve the second matrix based on the first pressure solution to generate a first saturation solution and a second pressure solution; and to use the first saturation solution and the second pressure solution to generate a solution of the first matrix. Additional apparatus, systems, and methods are disclosed.

20 Claims, 6 Drawing Sheets

(51) Int. Cl.
*E21B 43/00* (2006.01)
*E21B 43/20* (2006.01)

(52) U.S. Cl.
CPC .... *G01V 2210/645* (2013.01); *G01V 2210/66* (2013.01)

(58) Field of Classification Search
CPC ......... G01V 2210/66; G01V 2210/645; G05D 7/0676; E21B 43/20; E21B 43/00
USPC .............................................. 702/2; 703/10
See application file for complete search history.

(56) References Cited

U.S. PATENT DOCUMENTS

| | | |
|---|---|---|
| 2008/0167849 A1 | 7/2008 | Hales et al. |
| 2010/0004908 A1* | 1/2010 | Lunati ................. G06F 17/5018 703/2 |
| 2010/0088076 A1 | 4/2010 | Koutsabeloulis et al. |
| 2012/0203518 A1* | 8/2012 | Dogru ..................... E21B 43/00 703/2 |
| 2012/0232861 A1 | 9/2012 | Lu et al. |
| 2013/0085730 A1* | 4/2013 | Shaw ..................... G01V 11/00 703/2 |
| 2013/0116993 A1* | 5/2013 | Maliassov ................ G01V 9/00 703/2 |
| 2015/0073762 A1* | 3/2015 | Patacchini .............. E21B 43/16 703/10 |
| 2016/0003008 A1* | 1/2016 | Uribe ..................... E21B 43/00 175/50 |

OTHER PUBLICATIONS

Lee, Seong H., H. Zhou, and Hamdi A. Tchelepi. "Adaptive multiscale finite-volume method for nonlinear multiphase transport in heterogeneous formations." Journal of Computational Physics 228.24 (2009). pp. 9036-9058. (Year: 2009).*

Lee, Seong H., H. Zhou, and Hamdi A. Tchelepi. "Adaptive multiscale finite-volume method for nonlinear multiphase transport in heterogeneous formations." Journal of Computational Physics 228. 24 (2009). pp. 9036-9058. (Year: 2009).*

"International Application Serial No. PCT/US2014/043229, International Search Report dated Jan. 30, 2015", 3 pgs.

"International Application Serial No. PCT/US2014/043229, Written Opinion dated Jan. 30, 2015", 5 pgs.

Watts, J. W., et al., "A New Method for Solving the Implicit Reservoir Simulation Matrix Equation", SPE-93068, *SPE Reservoir Simulation Symposium* , Jan. 31-Feb. 2, 2005, The Woodlands, Texas, (2005), 1-7.

* cited by examiner

MULTI-STAGE LINEAR SOLUTION FOR IMPLICIT RESERVOIR SIMULATION

PRIORITY APPLICATIONS

This application is a U.S. National Stage Filing under 35 U.S.C. 371 from International Application No. PCT/US2014/043229, filed on 19 Jun. 2014; which application is incorporated herein by reference in its entirety.

BACKGROUND

Simulation of oil and gas reservoirs is important to the financial health of oil and gas exploration and production corporations. Reservoir simulation often requires solving non-linear partial differential equations and linear algebraic equations to predict reservoir behavior. Accordingly, available methods for reservoir simulation are computationally expensive. Ongoing efforts are directed at reducing computation time for modeling and predicting reservoir behavior.

DETAILED DESCRIPTION

To address some of the challenges described above, as well as others, apparatus, systems, and methods are described herein to perform simulations of oil and gas reservoirs in a manner quicker than methods currently available, while maintaining accuracy of the resulting simulations.

Reservoir simulation is important to the financial success of oil and gas exploration and production companies because reservoir simulation aids in the understanding of chemical, physical, and fluid flow processes occurring in a petroleum reservoir. This understanding can help operators predict future behavior of a reservoir and maximize recovery of hydrocarbons from the reservoir. Because properties and processes of a reservoir are complex, operators run computer programs, often referred to as reservoir simulators, to perform reservoir simulation through generation of a model of a reservoir.

Figure 1:
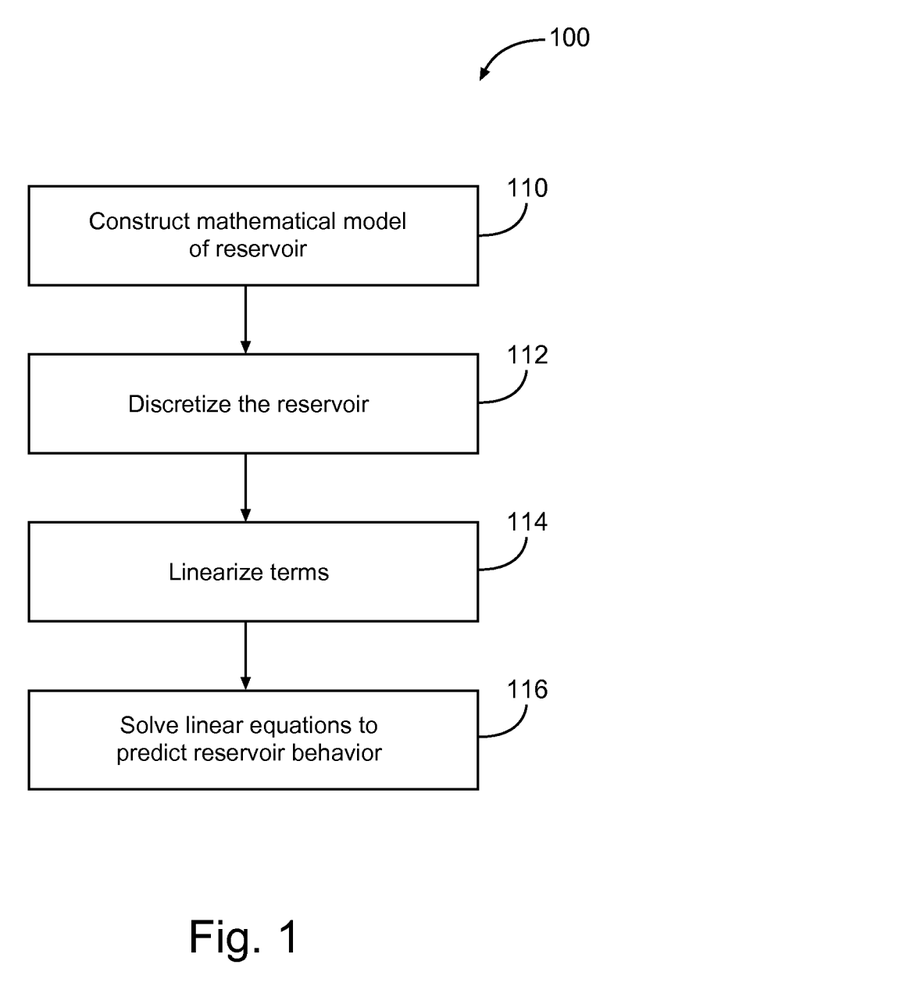
FIG. 1 is a flowchart illustrating a method for reservoir simulation in accordance with some embodiments.

FIG. 1 illustrates a method 100 for reservoir simulation such as can be used in available reservoir simulators and in reservoir simulators in accordance with some embodiments. During reservoir simulation, in operation 110, the reservoir simulator will construct a mathematical model of a reservoir based on the chemical, physical, and fluid flow processes occurring in the reservoir. The mathematical model may include a set of nonlinear partial differential equations.

Continuing with operation 112, the reservoir simulator discretizes the reservoir by, for example, logically dividing the reservoir into grid blocks and, based on the nonlinear partial differential equations generated in operation 110, assigning finite difference equations to represent properties, such as pressure and saturation, of each grid block. As used herein, the term "grid block" is defined as a unit or block that defines a portion of a three dimensional reservoir model. An entire set of grid blocks may constitute a geologic model that represents a subsurface volume of the earth, and each grid block preferably represents a unique portion of the subsurface volume. A reservoir simulator may define or choose dimensions of the grid blocks so that the reservoir properties within a grid block are relatively homogeneous, while considering that computational complexity may increase as the number of grid blocks increase. The contents of a grid block may be considered uniformly distributed within the grid block and the rates at which fluids flow in or out may be determined by the permeabilities within the grid block and the potential differences between adjacent grid blocks.

Continuing with operation 114, the reservoir simulator will linearize the nonlinear terms that appear in the nonlinear finite difference equations generated in operation 112 and, based on this linearization, construct linear algebraic equations assembled in a matrix equation.

Continuing with operation 116, the reservoir simulator will solve the linear algebraic equations generated in operation 114 to provide a prediction of reservoir behavior. Some reservoir simulators generate and solve the linear algebraic equations in a series of time steps. As used herein, the term "time step" is defined as an increment of time into which the life of a reservoir is discretized. For at least certain types of time steps, a reservoir simulator computes changes of parameters in the grid blocks over a time step for many time steps. In order to reduce complexity, the reservoir simulator defines conditions only at the beginning and end of a time step. Consequently, conditions within each grid block may change abruptly from one time step to the next. Reservoir simulators balance the need for simulation stability versus the need for reduced complexity in choosing the size of time steps, and such sizes can be adjusted automatically or by operators or other human users.

Several simulation methods for performing operation 116 have been proposed, each with its own benefits and drawbacks. For example, some simulation methods are stable and accurate, but require large amounts of processing time and power. In large part, the various simulation methods differ in how they treat variability of reservoir parameters with time. Some methods, known as implicit methods, may compute values for various variables iteratively, in other words, values for various parameters are not known until the end of a time step, and as a result, the values must be determined using an iterative process.

The Fully Implicit Method (FIM) is a commonly used implicit procedure for black-oil models that implement FIM calculate flow rates using pressures and saturations for grid blocks of the modeled reservoir at the end of each time step. In FIM, saturations cannot fall below zero because a fluid can only flow if it is mobile at the end of a time step. Fluids are mobile only for saturations greater than zero. Systems that implement FIM calculate flow rates, pressure and saturation by solving nonlinear equations using an iterative technique. Once pressures and saturations are solved, those terms will continue to be updated using new values of pressure and saturation, until convergence criteria are satisfied.

However, FIM is computationally expensive for compositional models when there are a large number of mass components involved in the models. Embodiments provide a more computationally efficient method for solving the linear algebraic equations arising in FIM compositional reservoir simulation. Methods and systems, in accordance with embodiments, extract a pressure-and-saturation matrix from the FIM linear algebraic equations using matrix transformation. Embodiments then reduce the pressure-and-saturation matrix to a pressure-only matrix.

Embodiments perform iteration steps to generate a solution for the pressure matrix, and embodiments use that solution to solve for saturation and pressure in the pressure-and-saturation matrix. Embodiments then generate a solution for mass based on solutions for pressure and saturation to provide solutions for all relevant parameters and variables that describe the reservoir. As the pressure matrix and the pressure-and-saturation matrix are smaller than the FIM matrix defining the FIM linear algebraic equations, they should be much less computationally expensive to solve, and by using the solution to these matrices, the number of iterations required to solve the full FIM matrix should be reduced. Accordingly, the overall time taken to solve the FIM matrix should be reduced.

In order to perform operation 116 and other operations in a reduced amount of time relative to available systems, a processor (such as processor 320 described later herein with reference to FIG. 3), can use equations (1)-(33), described below.

For example, in some embodiments, the processor 320 defines a mass conservation for any component i on a grid block according to:

$$\frac{\Delta m_i}{\Delta t} + \sum_{l=1}^{cons} J_{l,i} + Q_i + R_i \quad (1)$$

where $\Delta t$ is the time step size, and $\Delta m_i$ is the component mass change over this time step. $R_i$ is the mass residual in this grid block, and $Q_i$ is the well mass inflow/outflow rate, which is treated implicitly, l is the index of a connection between the grid block and another grid block, i is the index of the component or components present in this grid block, and cons is the total number of connections associated with grid block i. A component is defined as a chemical molecule or type of physical structure such as may be found in a reservoir to be simulated by a reservoir simulator according to embodiments described herein, or a mixture of chemical molecules with similar properties, that are lumped together as a single pseudo-component.

$J_{l,i}$ is the mass flow rate of component i on connection l between two grid blocks and is calculated as:

$$J_{l,i} = \sum_{j=1}^{np} \frac{c_{ij} \rho_j k_j}{\mu_j} T \Delta \Phi_j \quad (2)$$

where $\rho_j$, $\mu_j$ and $k_j$ are density, viscosity, and relative permeability of phase j, $c_{ij}$ is the concentration of component i in phase j, np is the number of phases (e.g., three phases for embodiments including oil, water, and gas), and T is the transmissibility, where transmissibility is a measure of the resistance to flow between two grid blocks, which depends on the grid block permeabilities and the geometry for the grid blocks. $\Delta \Phi_j$ is the potential drop, which is typically the pressure difference, with a contribution from gravity and capillary pressure, between the grid blocks over the connection l. Equation (2) can be considered as an expression of how easily fluid will flow from one grid block to another.

The processor 320 defines a volume balance equation:

$$V_p = V_f \quad (3)$$

where $V_p$ and $V_f$ are the pore volume of this grid block and the total fluid volume in this grid block, respectively, and expresses the idea that the fluid must fill up the pore volume of the grid block.

In available systems implementing a FIM method, the quantities, $c_{ij}$, $\rho_i$, $\mu_j$ and $k_j$, are treated implicitly as functions of pressure P and component mass $m_i$ and therefore the variables of interest are pressure P and component mass $m_i$. On the other hand, in available systems using an Implicit Pressure and Saturation method (IMPSAT), only $k_j$ is treated implicitly and the primary variables are pressure P and saturation $S_j$. In both methods, capillary pressure is treated implicitly.

In embodiments, the processor 320 extracts equations similar to IMPSAT equations from FIM equations that have been provided by previous operations (e.g., operation 114, FIG. 1), to convert the parameter set from pressure P and component mass $m_i$ to pressure P and saturation $S_j$. The processor 320 defines two matrices, the component phase density matrix $\xi$, and the partial phase volume derivatives matrix $\gamma$, according to Equations (4)-(12) to perform this extraction.

The component phase density matrix $\xi$ has nc rows based on the number of fluid components in the reservoir and np columns based on the number of phases (e.g., oil, gas, and water phases). The component phase density matrix $\xi$ is used to represent densities of the plurality of physical components in each of at least two physical phases, and based on an assumption of constant pressure and temperature. The component phase density matrix value for component i at phase j is defined as follows $$\xi_{ij} = c_{ij} \rho_j \quad (4)$$

where $c_{ij}$ is the concentration of component i in phase j and $\rho_j$ is the density of the phase j.

In a three phase gas-oil-water system, the component phase density matrix $\xi$ has a form as follows, $$\xi = \begin{bmatrix} x_1 \rho_O & y_1 \rho_G & w_1 \rho_W \\ x_2 \rho_O & y_2 \rho_G & w_2 \rho_W \\ \vdots & \vdots & \vdots \\ x_{nc} \rho_O & y_{nc} \rho_G & w_{nc} \rho_W \end{bmatrix} \quad (5)$$

where $x_i$, $y_i$ and $w_i$ are the mass/mole fractions of oil, gas, and water phase, respectively, and they should satisfy $$\sum_{i=1}^{nc} x_i = 1 \quad (6)$$

$$\sum_{i=1}^{nc} y_i = 1 \quad (7)$$

$$\sum_{i=1}^{nc} w_i = 1 \quad (8)$$

The processor 320 can reduce the component phase density matrix according to equation (9) if the solubility of hydrocarbon in the water phase is limited and it can also be assumed that the water component doesn't occur in gas or oil phase, $$\xi = \begin{bmatrix} x_1\rho_O & y_1\rho_G & 0 \\ x_2\rho_O & y_2\rho_G & 0 \\ \vdots & \vdots & \vdots \\ 0 & 0 & \rho_W \end{bmatrix} = \begin{bmatrix} \xi_c & 0 \\ 0 & \rho_w \end{bmatrix} \quad (9)$$

where $\xi_c$ the non-aqueous component phase density.

The processor 320 defines the partial phase volume derivatives with respect to component mass (or moles) as:

$$\gamma_{ij} = \frac{\partial V_j}{\partial m_i} \quad (10)$$

where $V_j$ are phase volumes and m are component masses.

For a three-phase gas-oil-water system, the partial phase volume derivative matrix is a matrix with three rows and nc columns, $$\gamma = \begin{bmatrix} \frac{\partial V_O}{\partial m_1} & \frac{\partial V_O}{\partial m_2} & \cdots & \frac{\partial V_O}{\partial m_{nc}} \\ \frac{\partial V_G}{\partial m_1} & \frac{\partial V_G}{\partial m_2} & \cdots & \frac{\partial V_G}{\partial m_{nc}} \\ \frac{\partial V_W}{\partial m_1} & \frac{\partial V_W}{\partial m_2} & \cdots & \frac{\partial V_W}{\partial m_{nc}} \end{bmatrix} \quad (11)$$

With the simplified interaction between water and the hydrocarbon phases aforementioned, Equation (11) can be rewritten as:

$$\gamma = \begin{bmatrix} \frac{\partial V_O}{\partial m_1} & \frac{\partial V_O}{\partial m_2} & \cdots & 0 \\ \frac{\partial V_G}{\partial m_1} & \frac{\partial V_G}{\partial m_2} & \cdots & 0 \\ 0 & 0 & \cdots & \frac{1}{\rho_W} \end{bmatrix} = \begin{bmatrix} \frac{\partial \vec{V_c}}{\partial \vec{m_c}} & 0 \\ 0 & \frac{1}{\rho_W} \end{bmatrix} \quad (12)$$

where $\vec{V}_c$ represents the vector of phase volumes of oil and gas phases, and $\vec{m}_c$ represents the vector of non-aqueous masses.

All the phase volume derivatives are calculated with pressure and temperature assumed constant. The phase volume derivative matrix can be understood to represent volume changes of physical phases over the mass change of a specified component with masses of other components, with temperature and pressure held constant. Multiplication of the phase volume derivative matrix and component phase density matrix typically approximates to an identity matrix, $$\gamma\xi \approx I \quad (13)$$

where I is an identity matrix. The processor 320 will define two operator matrices, based on $\gamma$ and $\xi$, for the linear transformation of the matrix resulting from the fully implicit method (FIM), as described below.

In available systems that use FIM, the primary variables are pressure P and component mass $m_j$, and the nonlinear system described in Equations (1) and (2) are solved using Newton's Method. The system is linearized with respect to the primary variables, and is assembled as a Jacobian matrix. Each grid block has linearized equations based on properties of the host grid block i and its nb neighboring grid blocks as follows:

$$A_{ii}\vec{x_i} + \sum_{j=1}^{nb} A_{ij}\vec{x_j} = \vec{b_i} \quad (14)$$

where j represents the neighboring grid blocks that connect to grid block i, and nb is total number of neighboring grid blocks. Other values of Equation (14) are further described below with respect to Equations (15)-(18).

The vector $\vec{x}_i$ defines primary variables on a grid block where the variables are ordered with all the non-aqueous components $m_1$, $m_2$ coming first, followed by the water component $m_w$ and pressure P. The non-aqueous masses can be combined into a sub-vector $M_c$:

$$\vec{x_i} = \begin{bmatrix} m_1 \\ m_2 \\ \vdots \\ m_{nc} \\ P \end{bmatrix}_i = \begin{bmatrix} M_c \\ m_W \\ P \end{bmatrix}_i \quad (15)$$

Similarly the linearized mass residual from Equation (1) and linearized volume residual from Equation (2) can be used to generate the right-hand side (RHS) vector $$\vec{b_i} = \begin{bmatrix} R_1 \\ R_2 \\ \vdots \\ R_{nc} \\ R_v \end{bmatrix}_i = \begin{bmatrix} R_c \\ R_w \\ R_v \end{bmatrix}_i \quad (16)$$

The diagonal sub-matrix $A_{ii}$ (used in later steps in description of linear transformation from FIM to IMPSAT) has the form as follows:

$$A_{ii} = \begin{bmatrix} J_{cc} & J_{cw} & J_{cP} \\ J_{wc} & J_{ww} & J_{wP} \\ -v_c & -v_w & c_P \end{bmatrix}_i \quad (17)$$

where J are the Jacobian derivatives with respect to primary variables on grid block i.

The off-diagonal matrix $A_{ij}$ (used in later steps in description of linear transformation from FIM to IMPSAT) is defined as:

$$A_{i,j} = \begin{bmatrix} J_{cc} & J_{cw} & J_{cP} \\ J_{wc} & J_{ww} & J_{wP} \\ 0 & 0 & 0 \end{bmatrix}_j \quad (18)$$

where J are the Jacobian derivatives with respect to primary variables on neighboring grid block j.

The water mass $m_w$ can be eliminated by using the volume balance equation. For example, the second column in Equation (17) is eliminated using the last row of Equation (17), and the second column in Equation (18) is eliminated using the last row of diagonal sub-matrix of grid block j, which has a similar structure as Equation (17).

The resulting diagonal sub-matrix is reduced to eliminate one variable, according to methods understood by those of ordinary skill in the art based on a property of volume of a grid block, to:

$$\hat{A}_{ii} = \begin{bmatrix} J_{cc} - J_{cw}v_w^{-1}v_c & J_{cP} + J_{cw}v_w^{-1}c_P \\ J_{wc} - J_{ww}v_w^{-1}v_c & J_{wP} + J_{ww}v_w^{-1}c_P \end{bmatrix}_i \quad (19)$$

And the off-diagonal sub-matrix is $$\widehat{A_{ii}} = \begin{bmatrix} J_{cc} - J_{cw}v_w^{-1}v_c & J_{cP} + J_{cw}v_w^{-1}c_P \\ J_{wc} - J_{ww}v_w^{-1}v_c & J_{wP} + J_{ww}v_w^{-1}c_P \end{bmatrix}_j \quad (20)$$

The RHS vector from Equation (14) is updated accordingly:

$$\vec{b}_i = \begin{bmatrix} R_c + J_{cw}v_w^{-1}R_v + \sum_{j=1}^{nb}(J_{cw}v_w^{-1}R_v)_j \\ R_w + J_{ww}v_w^{-1}R_v + \sum_{j=1}^{nb}(J_{ww}v_w^{-1}R_v)_j \end{bmatrix}_i \quad (21)$$

The variable vector from Equation (14) is:

$$\vec{x}_i = \begin{bmatrix} M_c \\ P \end{bmatrix}_i \quad (22)$$

The processor 320, having defined equations (18), (19), (20), and (21), also referred to as FIM equations, as above, can assemble the equations, grid block by grid block, into a global linear system as follows $$Ax = b \quad (23)$$

The total size of the linear system A will equal the total number of grid blocks of the reservoir multiplied by the total number of components in the reservoir. Embodiments use a restriction operator $\hat{R}$ and prolongation operator $\hat{P}$ to reduce the size of the linear system A to transform Equation (23) to:

$$\hat{A}u = \hat{b} \quad (24)$$

with $$\hat{A} = \hat{R}A\hat{P} \quad (25)$$

and $$\hat{b} = \hat{R}b \quad (26)$$

The processor 320 generates the restriction operator $\hat{R}$ defined as a diagonal matrix as follows:

$$\hat{R} = \begin{bmatrix} R_1^- & & & \\ & R_2^- & & \\ & & \ddots & \\ & & & R_{ng}^- \end{bmatrix} \quad (27)$$

where the diagonal sub-matrix $\hat{R}_i$ corresponds to the partial phase volume derivatives at grid block i, as shown in Equation (11), with the last row modified to the total volume derivatives $$R_i = \begin{bmatrix} \dfrac{\partial \vec{V_c}}{\partial \vec{M_c}} & 0 \\ \dfrac{\partial V_f}{\partial \vec{M_c}} & \rho_w \end{bmatrix}_i \quad (28)$$

where $V_f = V_O + V_G + V_W$.

The prolongation operator $\hat{P}$ is also a diagonal matrix as follows, $$\hat{P} = \begin{bmatrix} P_1 & & & \\ & P_2 & & \\ & & \ddots & \\ & & & P_{ng} \end{bmatrix} \quad (29)$$

where the diagonal sub-matrix $\hat{P}_i$ takes the value of $V_f\xi_c$, and $V_f$ is the total fluid volume and is the phase density matrix with respect to non-aqueous components as defined in Equation (9). Since the water component mass is not included in the linear system as shown in Equation (23), the prolongation operator $\hat{P}$ is modified as follows, such that the prolongation operator $\hat{P}$ has elements corresponding to elements of the phase density matrix for oil and gas phases multiplied by the total fluid volume:

$$\hat{P} = \begin{bmatrix} x_1\rho_O V_f & y_1\rho_G V_f & 0 \\ x_2\rho_O V_f & y_2\rho_G V_f & 0 \\ \vdots & \vdots & \vdots \\ 0 & 0 & 1 \end{bmatrix}_i = \begin{bmatrix} V_f\xi_c & 0 \\ 0 & 1 \end{bmatrix} \quad (30)$$

Embodiments generate a prolongation operator $\hat{P}$ such that the iterations for solving for component mass minimize disruption in the saturation and pressure solutions from the previous solutions.

The linear system shown in Equation (22) can be further reduced to a system with pressure as the only unknown using the constrained pressure residual (CPR) method known by those of ordinary skill in the art, to reduce to:

$$\check{A}p = \check{b} \quad (31)$$

with $$\check{A} = \check{R}\hat{A}\check{P} \quad (32)$$

and $$\check{b} = \check{R}\hat{b} \quad (33)$$

The processor 320 can use the Equations (1)-(33) to reduce linear systems representing the reservoir model to smaller linear systems. The processor 320 can then use an iterative, multistage process, to solve the reduced linear systems generated with Equations (1)-(33) to simulate a reservoir. FIGS. 2A-2D is a flowchart illustrating an example multistage solution 200 for solving linear equations for representing reservoir models in accordance with some embodiments.

Figure 2A:
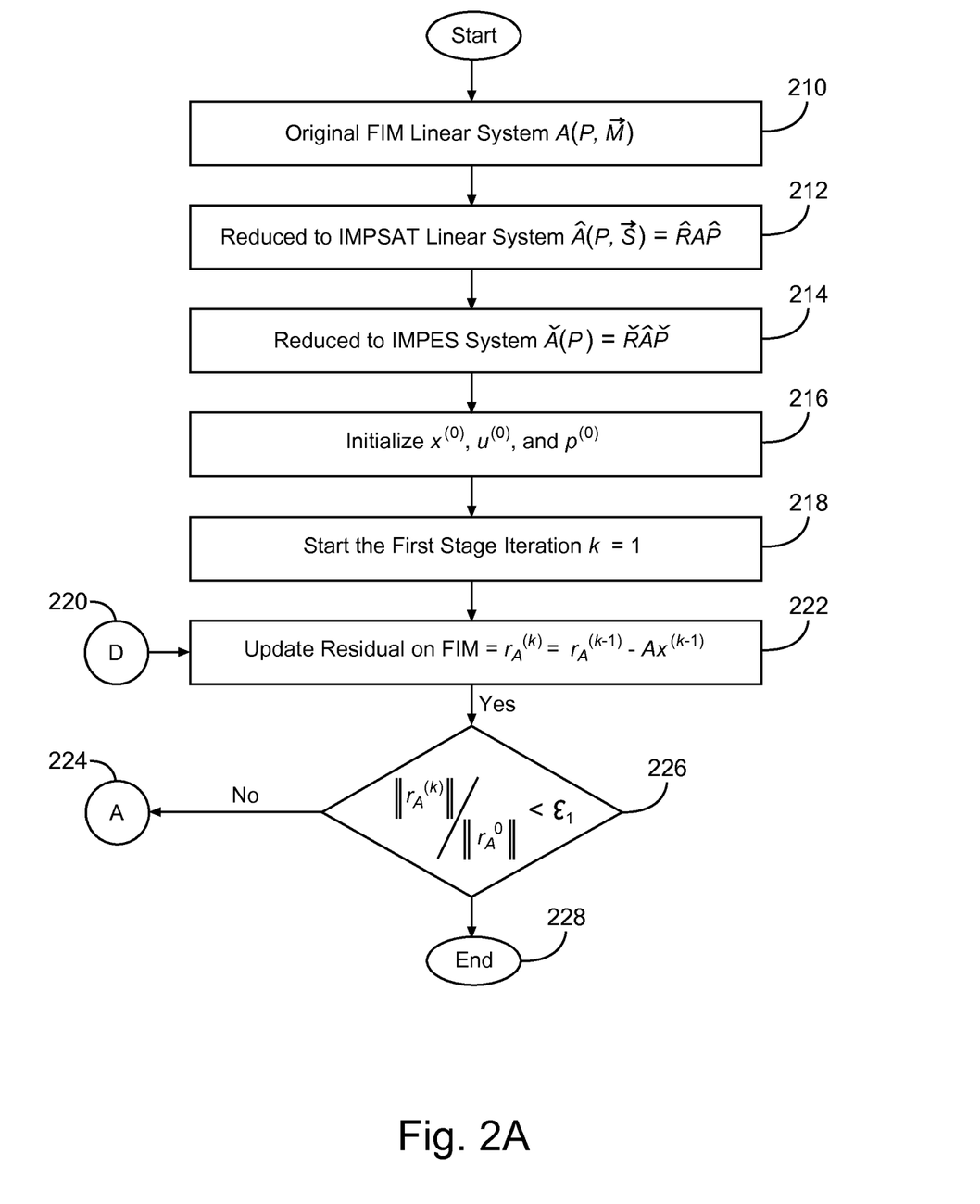
FIGS. 2A-2D are portions of a flowchart illustrating an iterative multistage solution for solving linear equations for representing reservoir models in accordance with some embodiments.

An example multistage solution 200 begins with operation 210, in which the processor 320 accesses a linear system of equations that represent fluid flow properties of a reservoir. As described earlier herein, the reservoir can be associated with a plurality of grid blocks and a plurality of physical components. The linear system can be described as a matrix A, which includes mass conservation information for the physical components of the reservoir grid blocks and volume balance information for the grid blocks of the reservoir. The matrix A may include primary variables pressure P and a mass vector $\vec{M}$, where $\vec{M}$ includes masses for the non-aqueous components at the oil, gas or water phase. as described earlier herein.

The multistage solution 200 continues with operation 212, in which the processor 320 transforms the linear system of operation 210 to an IMPSAT linear system Â, which includes saturation information and pressure information. Â can be expressed as a matrix, with primary variables pressure P and a saturation vector $\vec{S}$ as shown in FIG. 2. The processor 320 may use Equation (25), for example, as described earlier herein, to perform this transformation.

The multistage solution 200 continues with operation 214, in which the processor 320 reduces the IMPSAT linear system of operation 212 to remove the saturation information to generate an Implicit Pressure (IMPES) linear system Ä, expressed in matrix form, which includes the pressure information for the plurality of grid blocks. The processor 320 may use Equation (32), for example, as described earlier herein, to perform the reduction of operation 214.

The multistage solution 200 continues with operation 216, in which the processor 320 initializes values for solutions x, u and p of each grid block. x, u, and p represent the solutions for FIM, IMPSAT, and IMPES systems, corresponding to Equations 23, 24, and 31, respectively.

The multistage solution 200 continues with operation 218, in which the processor 320 begins an iterative method for the numerical solution of the overall FIM linear system expressed by matrix A by initializing an index k to 1. In operation 222, the processor 320 updates the residual $r_A^{(k)}$ according to techniques understood by those of ordinary skill in the art and according to:

$$r_A^{(k)} = r_A^{(k-1)} - Ax^{(k-1)} \tag{34}$$

The multistage solution 200 continues with operation 226 in which the processor 320 tests whether the residual $r_A$ has converged, and, if the residual $r_A$ has converged, the processor 320 ends the multistage solution 200 operation 228. This signifies that the processor 320 has found a solution for the original FIM linear system A. Otherwise, the processor 320 continues with the second-stage iteration, starting with operation 224, to solve the IMPSAT linear system Â and the IMPES linear system Ä.

In operation 230, the processor 230 initializes a second stage iteration variable l and in operation 232, the processor 320 restricts the residual $r_B$ for the IMPSAT-like linear system according to:

$$r_B^{(l-1)} = \hat{R} r_A^{(k)} \tag{35}$$

Figure 2B:
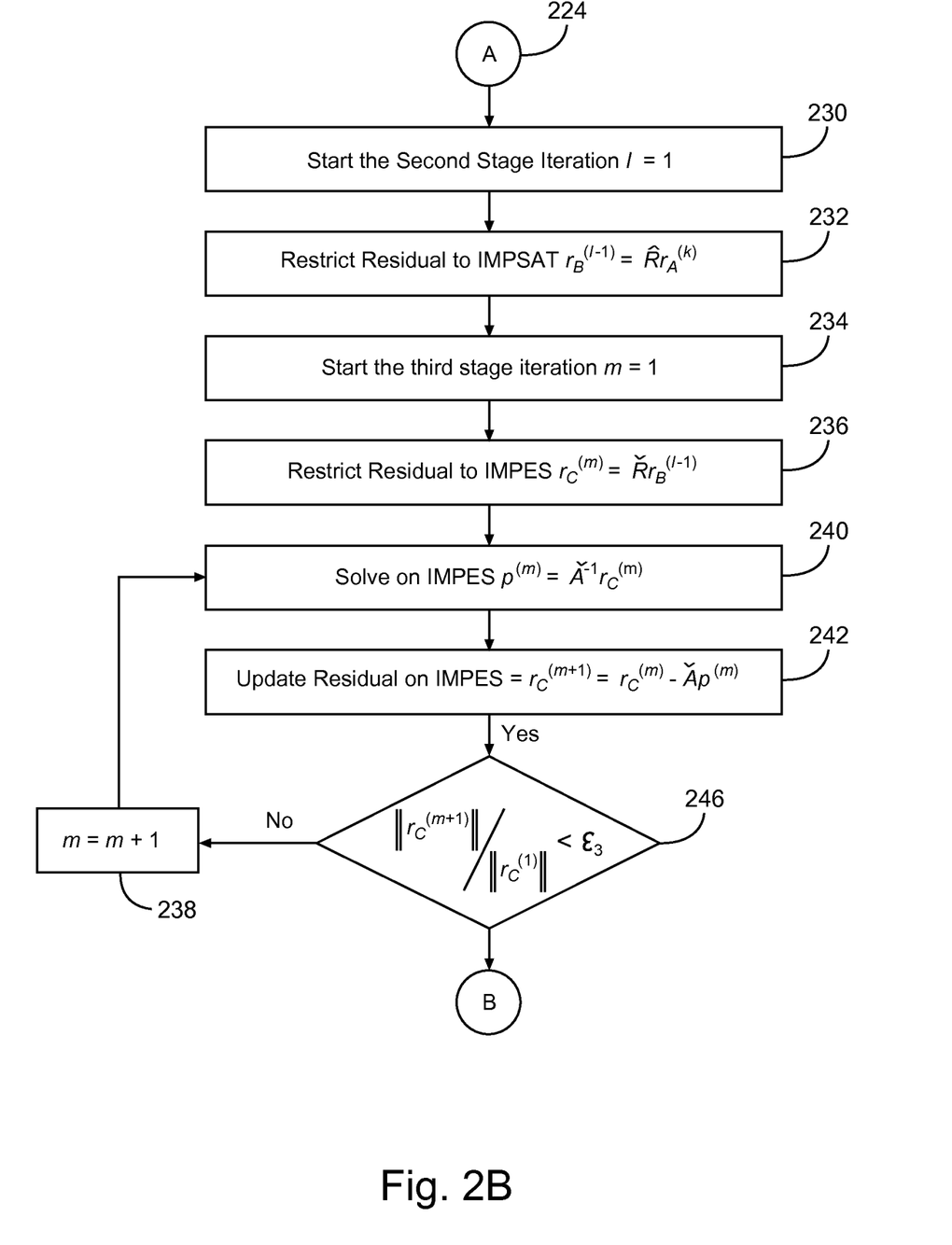

In operation 234, the processor 320 initializes a third stage iteration variable m and in operation 236, the processor 320 restricts the residual $r_C$ to be used over the IMPES linear system according to:

$$r_C^m = \check{R} r_B^{l-1} \tag{36}$$

In operation 240, the processor 320 solves the IMPES linear system $p^{(m)}$ according to:

$$p^{(m)} = \check{A}^{-1} r_C^{(m)} \tag{37}$$

In operation 242, the processor updates the residual $r_C$ for the IMPES linear system $p^{(m)}$ according to:

$$r_C^{(m+1)} = r_C^{(m)} - \check{A} p^{(m)} \tag{38}$$

The multistage solution 200 continues with operation 246 in which the processor 320 tests whether the residual $r_C$ has converged. If the residual $r_C$ has converged, the processor 320 determines that the processor 320 has generated a first pressure solution p for the grid blocks, and the processor 320 uses this first pressure solution p in further operations. Otherwise, the processor 320 increments the index m and continues to solve on IMPES in step 240 and then update the residual $r_C$ based on increments of m until the residual $r_C$ converges, signifying that the processor 320 has solved the IMPES linear system $p^{(m)}$ to generate the first pressure solution P̌ for the grid blocks.

Figure 2C:
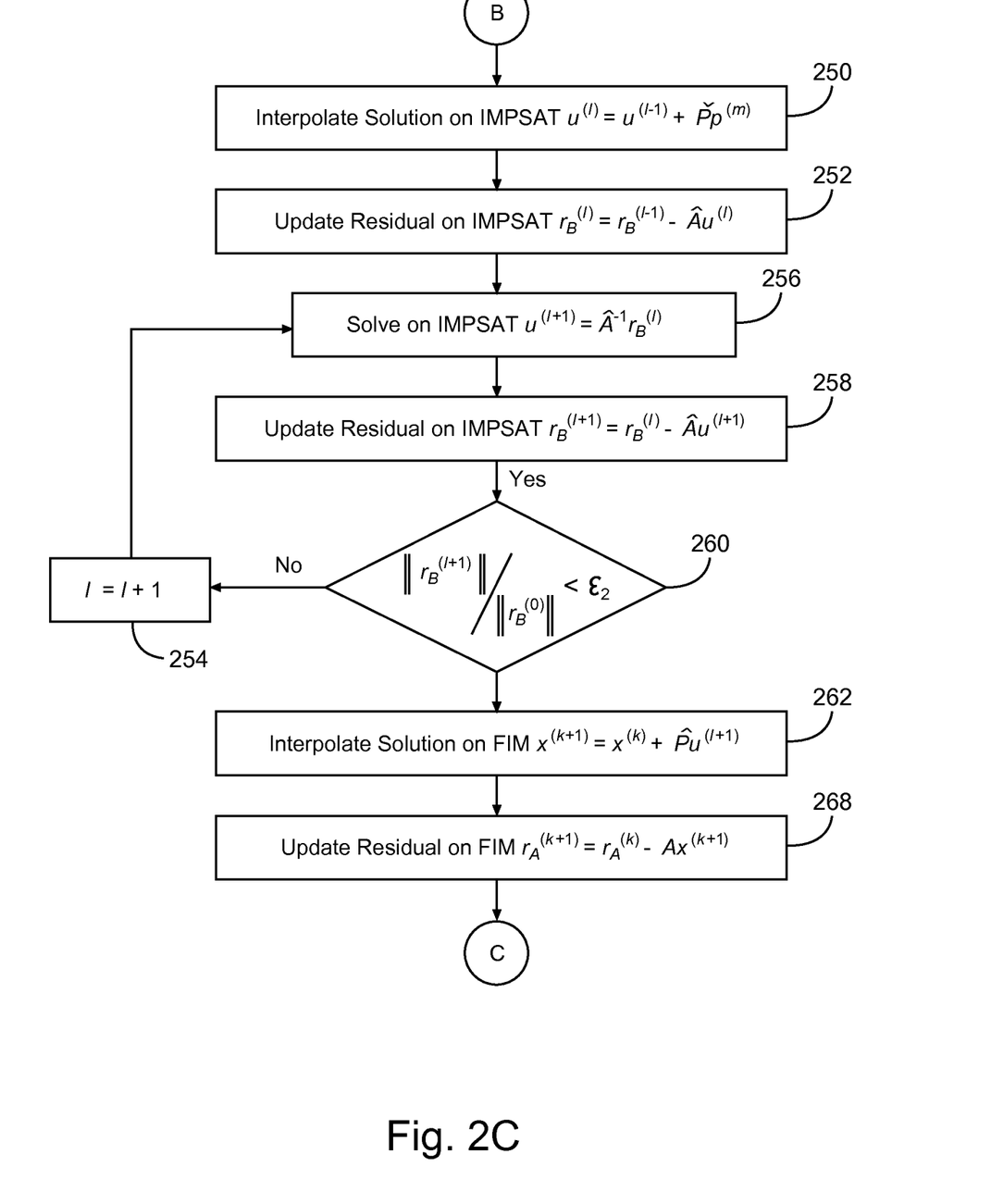

Once the processor 320 has solved the IMPES linear system $p^{(m)}$ to generate the first pressure solution p in operation 250, the processor 320 uses $p^{(m)}$ to interpolate or estimate a solution for the IMPSAT system. IMPSAT linear system $u^{(l)}$ according to:

$$u^{(l)} = u^{(l-1)} + \check{P} p^{(m)} \tag{39}$$

In operation 252, the processor updates the residual $r_B$ for the IMPSAT linear system $u^{(l)}$ according to:

$$r_B^{(l)} = r_B^{(l-1)} - \hat{A} u^{(l)} \tag{40}$$

In operation 256, the processor 320 solves the IMPSAT linear system $u^{(l+1)}$ according to:

$$u^{(l+1)} = \hat{A}^{-1} r_B^{(l)} \tag{41}$$

In operation 258, the processor 320 updates the residual on the IMPSAT linear system $r_B^{(l+1)}$ according to:

$$r_B^{(l+1)} = r_B^{(l)} - \hat{A} u^{(l+1)} \tag{42}$$

The multi-stage solution 200 continues with operation 260 in which the processor 320 tests whether the residual $r_B$ has converged, and, if the residual $r_B$ has converged, the processor 320 continues with operations beginning at operation 262. Otherwise, the processor 320 increments the index/and continues to solve on IMPSAT in step 256, and then update the residual $r_B$ based on increments of l until the residual $r_B$ converges, signifying that the processor 320 has solved the IMPSAT linear system $u^{(l+1)}$ to generate saturation and pressure solutions.

Figure 2D:
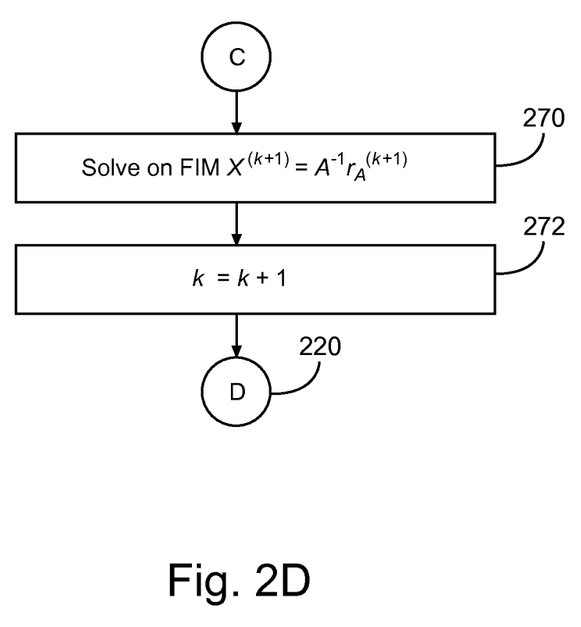

In operation 262, the processor 320 interpolates a solution of the FIM linear system according to:

$$x^{(k+1)} = x^{(k)} + \hat{P} u^{(l+1)} \tag{43}$$

The processor 320 then updates the residual $r_A$ in operation 258 according to:

$$r_A^{(k+1)} = r_A^{(k)} - A x^{(k+1)} \tag{44}$$

In operation 270, the processor 320 generates a solution for the FIM linear system according to:

$$x^{(k+1)} = A^{-1} r_A^{(k+1)} \tag{45}$$

In operation 272, the processor increments the index k and returns back to operation 220 to update the FIM residual $r_A$. Depending on the result of the convergences described earlier herein regarding operation 226, the processor 320 may determine that the original FIM linear system has been solved, or iterate through other operations described earlier herein. The processor 320 can then generate a display including information representative of the solution of the original FIM linear system. The processor 320 can perform operations or receive user input based on this display. For example, the processor 320 can receive an input of drilling coordinates to control a drilling instrument for recovering resources from the reservoir, based on human or automatic analysis of the simulation of the reservoir.

Figure 3:
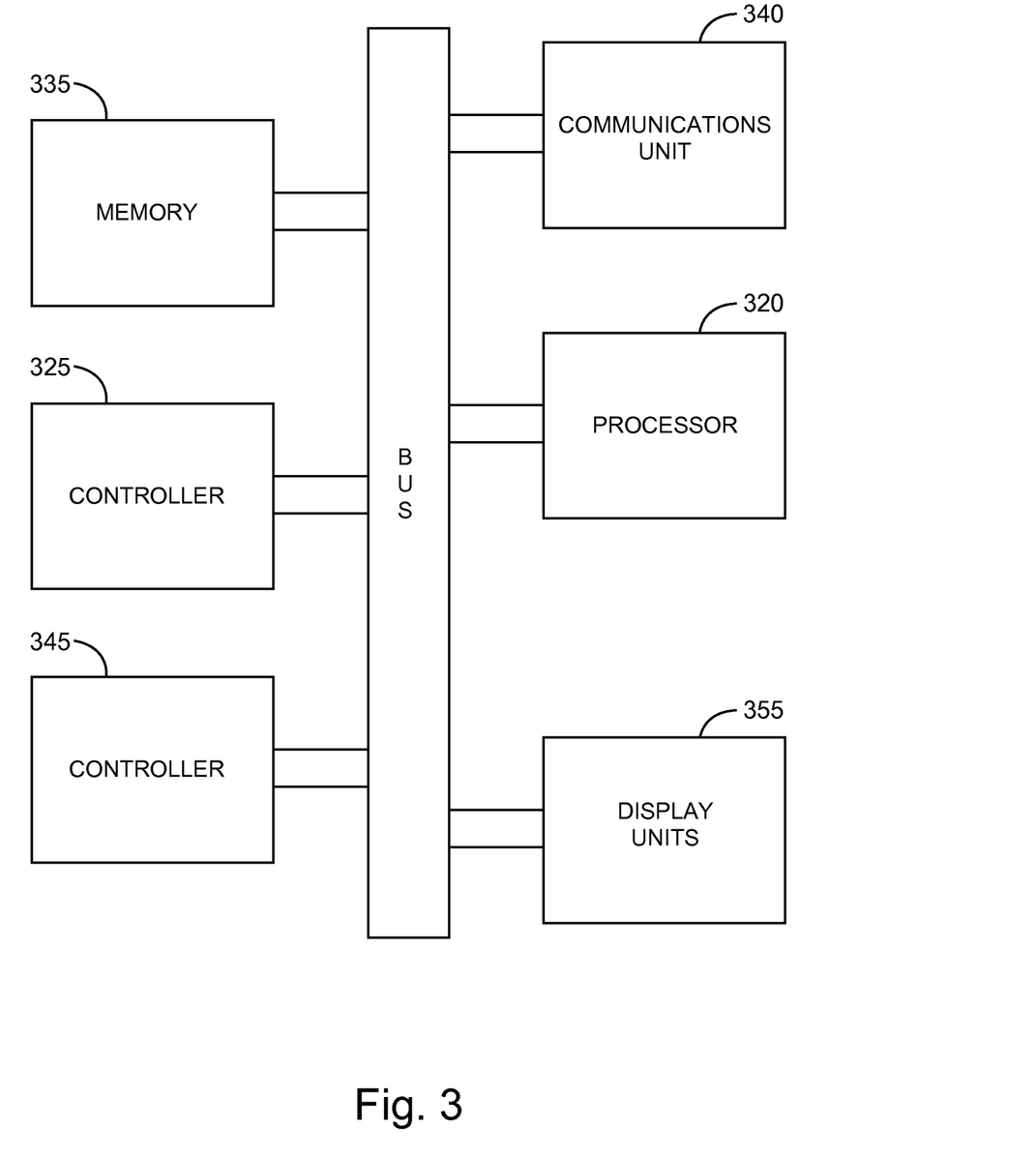
FIG. 3 is a block diagram of a computer system for implementing some embodiments.

FIG. 3 depicts a block diagram of features of a system 300 in accordance with various embodiments. The system 300 can model reservoirs as described above.

The system 300 can include a controller 325 and a memory 335. The controller 325 can operate to provide drilling coordinates to control a drilling instrument for recovering reservoir resources in drilling locations based on simulations of those reservoirs as described herein, or the system 300 can provide these coordinates to another system (not shown in FIG. 3) for controlling a drilling instrument.

The memory 335 can store equations that represent fluid flow properties of the reservoir, where the reservoir is associated with a plurality of grid blocks and a plurality of physical components. The processor 320 can access these or equations to perform reservoir modeling described herein, for example, or for other purposes.

For example, the processor 320 can use the equations to generate a first matrix generate a first matrix that includes mass conservation information for the plurality of physical components and volume balance information for grid blocks associated with a reservoir. The processor 320 can transform the mass conservation information and the volume balance information in the first matrix to generate a second matrix by generating a phase density matrix to represent densities of the plurality of physical components in each of at least two physical phases. The processor 320 can subsequently generate a phase volume derivative matrix to represent volume changes of the at least two physical phases, and the processor 320 can generate a restriction operator and a prolongation operator, based on the phase density matrix and the phase volume derivative matrix, for use in transforming the first matrix. The processor 320 can reduce the second matrix to remove the saturation information to generate a third matrix that includes pressure information for the plurality of grid blocks. The processor 320 can solve the third matrix to generate a first pressure solution for the plurality of grid blocks. The processor 320 can solve the second matrix based on the first pressure solution to generate a first saturation solution and a second pressure solution for the plurality of grid blocks. The processor 320 can then use the first saturation solution and the second pressure solution to generate a solution of the first matrix. The processor 320 can provide the solution of the first matrix or any other information to the display 355 for use in displaying the reservoir simulation graphically or in association with coordinates of the reservoir being modeled.

The communications unit 340 can provide downhole communications in a drilling operation, although such downhole communications can also be provided by any other system located at or near drilling coordinates of a surface of the Earth where drilling will take place. Such downhole communications can include a telemetry system.

The system 300 can also include a bus 327, where the bus 327 provides electrical conductivity among the components of the system 300. The bus 327 can include an address bus, a data bus, and a control bus, each independently configured. The bus 327 can also use common conductive lines for providing one or more of address, data, or control, and the controller 325 can regulate usage of these lines. The bus 327 can include instrumentality for a communication network. The bus 327 can be configured such that the components of the system 300 are distributed. Such distribution can be arranged between downhole components and components that can be disposed on the surface of a well. Alternatively, various ones of these components can be co-located, such as on one or more collars of a drill string or on a wireline structure.

In various embodiments, the system 300 comprises peripheral devices 345 that can include displays, user input devices, additional storage memory, and control devices that may operate in conjunction with the controller 325 or the memory 335. For example, the peripheral devices 345 can include a user input device to receive user input responsive to providing display data representative of a reservoir or simulation of a reservoir s determined by the system 300 or for data related to operations such as drilling operations. The peripheral devices 345 can include a display for displaying solutions of the simulation, and drilling coordinates to control a drilling instrument for recovering resources from a grid block based on the simulation.

In an embodiment, the controller 325 can be realized as one or more processors. The peripheral 345 can be programmed to operate in conjunction with display unit(s) 1055 with instructions stored in the memory 335 to implement a graphical user interface (GUI) to manage the operation of components distributed within the system 300. A GUI can operate in conjunction with the communications unit 1040 and the bus 327.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 335 in the form of read only memory (ROM), random access memory (RAM), a magnetic disk storage device, an optical storage device, a flash memory, and other electronic, magnetic, or optical memory devices, including combinations thereof.

One or more processors such as, for example, the processing unit 320, can operate on the physical structure of such instructions. Executing these instructions determined by the physical structures can cause the machine to perform operations to access equations that represent fluid flow properties of the reservoir, the reservoir including a plurality of grid blocks, and a plurality of physical components; to generate a first matrix, based on the equations, that includes mass conservation information for the plurality of physical components and volume balance information for the plurality of grid blocks in the reservoir; to transform the first matrix to generate a second matrix that includes saturation information and pressure information of each grid block of the plurality of grid blocks; to reduce the second matrix to remove the saturation information to generate a third matrix that includes pressure information of each grid block of the plurality of grid blocks; to solve the third matrix to generate a first solution for pressure of the plurality of grid blocks; to solve the second matrix based on the first solution for pressure to generate a first solution for saturation and a second solution for pressure of the plurality of grid blocks; and to use the first solution for saturation the second solution for pressure in the first matrix to generate a solution, within a tolerance, of the first matrix.

The instructions can include instructions to cause the processing unit 320 to perform any of, or a portion of, the above-described operations in parallel with performance of any other portion of the above-described operations.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A processor-implemented reservoir simulation method comprising:
   accessing equations in three sequential stages that represent fluid flow properties of a reservoir, the reservoir associated with a plurality of grid blocks and a plurality of physical components;
   in a first stage generating a first matrix, based on the equations, that includes mass conservation information for the plurality of physical components and volume balance information for the plurality of grid blocks;
   in a second stage transforming the mass conservation information and the volume balance information in the first matrix into saturation information and pressure information included in a second matrix for the same plurality of grid blocks used in the first stage;
   in a third stage using a constrained pressure residual method, reducing the second matrix to remove the saturation information to generate a third matrix that includes the pressure information for the same plurality of grid blocks used in the second stage, wherein the pressure information is the only unknown in the third matrix;
   solving the third matrix to generate a first pressure solution for the plurality of grid blocks;
   solving the second matrix based on the first pressure solution to generate a first saturation solution and a second pressure solution for the plurality of grid blocks;
   using the first saturation solution and the second pressure solution to generate a solution of the first matrix in the first stage;
   generating a simulation that predicts behavior of the reservoir based on the solution of the first matrix; and
   recovering resources from the reservoir based upon the simulation.

2. The method of claim 1, wherein transforming the first matrix comprises:
   generating a component phase density matrix to represent densities of the plurality of physical components in each of at least two physical phases;
   generating a phase volume derivative matrix to represent volume changes of the at least two physical phases; and
   generating a restriction operator and a prolongation operator, based on the component phase density matrix and the phase volume derivative matrix, for use in transforming the first matrix.

3. The method of claim 2, wherein the restriction operator includes a diagonal matrix with a first diagonal sub-matrix having elements corresponding to elements of the phase volume derivative matrix with the last row of the first diagonal sub-matrix being modified to include total volume derivatives.

4. The method of claim 3, wherein the prolongation operator includes a diagonal matrix with a second diagonal sub-matrix having elements corresponding to elements of the component phase density matrix which have been multiplied by total fluid volume and with the last row and last column of the second diagonal sub-matrix being all zeroes with the exception of a unity diagonal entry.

5. The method of claim 4, wherein the physical phases include a gas phase, an oil phase, or a water phase.

6. The method of claim 2, further comprising:
   reducing the phase density matrix and the phase volume derivative matrix to eliminate the water phase.

7. The method of claim 1, further comprising:
   predicting behavior of the reservoir using the simulation; and
   based upon the predicted behavior, controlling a drilling instrument for recovering resources from the reservoir.

8. A reservoir simulation system including:
   memory to store equations obtained from three sequential stages that represent fluid flow properties of a reservoir, the reservoir associated with a plurality of grid blocks and a plurality of physical components;
   one or more processors to:
   in a first stage generate a first matrix, based on the equations, that includes mass conservation information for the plurality of physical components and volume balance information for the plurality of grid blocks;
   in a second stage transform the mass conservation information and the volume balance information for the same plurality of grid blocks used in the first matrix to generate a second matrix by:
      generating a component phase density matrix to represent densities of the plurality of physical components in each of at least two physical phases;
      generating a phase volume derivative matrix to represent volume changes of the at least two physical phases; and
      generating a restriction operator and a prolongation operator, based on the component phase density matrix and the phase volume derivative matrix, for use in transforming the first matrix;
   in a third stage using a constrained pressure residual method, reduce the second matrix to remove saturation information to generate a third matrix that includes pressure information for the same plurality of grid blocks used in the second matrix, wherein the pressure information is the only unknown in the third matrix;
   solve the third matrix to generate a first pressure solution for the plurality of grid blocks;
   solve the second matrix based on the first pressure solution to generate a first saturation solution and a second pressure solution for the plurality of grid blocks; and
   use the first saturation solution and the second pressure solution to generate a solution of the first matrix in the first stage;
   generate a simulation that predicts behavior of the reservoir based on the solution of the first matrix; and
   recover resources from the reservoir based upon the simulation.

9. The system of claim 8, further comprising:
   a display to display solutions of the simulation which predict behavior of the reservoir, whereby, based upon the predicted behavior, drilling coordinates may be selected to control a drilling instrument for recovering resources from the reservoir; and an input device to receive the drilling coordinates.

10. The system of claim 9, further comprising a control system to receive the drilling coordinates and to control the drilling instrument.

11. The system of claim 8, wherein the restriction operator includes a diagonal matrix with a diagonal sub-matrix with elements corresponding to elements of the phase volume derivative matrix.

12. The system of claim 11, wherein the prolongation operator includes a diagonal matrix with a diagonal sub-matrix having elements corresponding to elements of the component phase density matrix.

13. The system of claim 12, wherein the physical phases include a gas phase, an oil phase, and a water phase.

14. The system of claim 13, wherein the processor is further configured to reduce the phase density matrix and the phase volume derivative matrix to eliminate the water phase.

15. A non-transitory machine-readable storage device having instructions stored thereon which, when performed by a machine, cause the machine to perform operations, the operations comprising:

accessing equations in three sequential stages that represent fluid flow properties of a reservoir, the reservoir associated with a plurality of grid blocks and a plurality of physical components;

in a first stage generating a first matrix, based on the equations, that includes mass conservation information for the plurality of physical components and volume balance information for the plurality of grid blocks;

in a second stage transforming the mass conservation information and the volume balance information in the first matrix into saturation information and pressure information included in a second matrix for the same plurality of grid blocks used in the first stage;

in a third stage using a constrained pressure residual method, reducing the second matrix to remove the saturation information to generate a third matrix that includes the pressure information for the same plurality of grid blocks used in the second stage, wherein the pressure information is the only unknown in the third matrix;

solving the third matrix to generate a first pressure solution for the plurality of grid blocks;

solving the second matrix based on the first pressure solution to generate a first saturation solution and a second pressure solution for the plurality of grid blocks; and using the first saturation solution and the second pressure solution to generate a solution of the first matrix in the first stage;

generating a simulation that predicts behavior of the reservoir based on the solution of the first matrix; and recover resources from the reservoir based upon the simulation.

16. The non-transitory machine-readable storage device of claim 15, wherein the instructions, when accessed, result in the machine:

generating a phase density matrix to represent densities of the plurality of physical components in each of at least two physical phases;

generating a phase volume derivative matrix to represent volume changes of the at least two physical phases, with respect to mass changes and based on constant pressure and constant pressure; and generating a restriction operator and a prolongation operator, based on the phase density matrix and the phase volume derivative matrix, for use in transforming the first matrix.

17. The non-transitory machine-readable storage device of claim 16, wherein the restriction operator includes a diagonal matrix with a diagonal sub-matrix with elements corresponding to elements of the phase volume derivative matrix.

18. The non-transitory machine-readable storage device of claim 17, wherein the prolongation operator includes a diagonal matrix with a diagonal sub-matrix having elements corresponding to elements of the phase density matrix.

19. The non-transitory machine-readable storage device of claim 18, wherein the physical phases include a gas phase, an oil phase, and a water phase, and wherein the instructions, when accessed, result in the machine:

reducing the phase density matrix and the phase volume derivative matrix to eliminate the water phase.

20. The non-transitory machine-readable storage device of claim 15, wherein the instructions, when accessed, result in the machine:

predicting behavior of the reservoir using the simulation; and based upon the predicted behavior, controlling a drilling instrument for recovering resources from the reservoir.

* * * * *